United States Patent [19]

Schmidtlein et al.

[11] Patent Number: 4,514,733
[45] Date of Patent: Apr. 30, 1985

[54] CONTROL SYSTEM FOR AIRCRAFT

[75] Inventors: Hubertus Schmidtlein, Achim; Horst-Dieter Lerche, Stuhr, both of Fed. Rep. of Germany

[73] Assignee: Vereinigte Flugtechnische Werke, Bremen, Fed. Rep. of Germany

[21] Appl. No.: 350,261

[22] Filed: Feb. 19, 1982

Related U.S. Application Data

[63] Continuation of Ser. No. 834,008, Sep. 13, 1977, abandoned.

[30] Foreign Application Priority Data

Sep. 15, 1976 [DE] Fed. Rep. of Germany ....... 2641447

[51] Int. Cl.³ ............................................ G01S 13/00
[52] U.S. Cl. .......................... 343/5 MM; 343/7 TA; 364/456
[58] Field of Search ...................... 343/5 MM, 7 TA; 364/456

[56] References Cited

U.S. PATENT DOCUMENTS 3,805,261 4/1974 Deschamps et al. ........... 343/5 MM

Primary Examiner—S. C. Buczinski
Attorney, Agent, or Firm—Ralf H. Siegemund

[57] ABSTRACT

A terrain-contour-matching guidance method is disclosed in which topographic reference data are made to include the same systematic errors which altitude measurement of an unmanned flight is expected to produce. Speed/course and general flight path tracking is operated on a higher resolution.

1 Claim, 3 Drawing Figures

CONTROL SYSTEM FOR AIRCRAFT

This is a continuation of application Ser. No. 834,008 filed Sept. 13, 1977, now abandoned.

BACKGROUND OF THE INVENTION

The present invention relates to automated navigation of aircraft using reference data.

A paper, entitled "New Guidance Technique Being Tested" published in Aviation Week & Space Technology, Feb. 25, 1974, pages 48 to 51, describes a terrain-contour-matching guidance technique using topographic data for controlling a guidance system for cruise missiles, balistic missile, re-entry vehicles, etc. The system requires a running update of actual position data to be referenced against stored topographic reference data. The system uses specifically the principle of correlation to determine the actual position of the wall. The system has an inherent limitation as to accuracy because the source material (topographic maps, stero aerial pictures, etc.) are rather inaccurate and provide only very low resolution reference data. For many purposes, such as the guidance of tactical nuclear weapons, the resolution is sufficient. An aircraft or the like with a non-nuclear, conventional warhead, however, is not adequately accurately guided in that manner.

DESCRIPTION OF THE INVENTION

It is an object of the present invention to improve the accuracy of the above-mentioned aircraft navigation and guiding systems, in a manner not made obvious by the publication mentioned above.

In accordance with the preferred embodiment of the present invention, it is suggested to use topographic reference data which have been acquired on the same basis as topographic position data will be acquired and used during automated navigation using these reference data. Alternatively, it is suggested to use reference data which are being corrected on the basis of such comparably acquired information. The principle behind the invention is to increase accuracy by using reference data which include the same inherent system errors (other than random errors) as the topographic position data which the craft to be controlled acquires during its automated navigation. Generally speaking, the invention proposes to use reference data which include terrain specifics in addition to topographic data, in that the terrain modification of the topographic data are included in the reference data as they will be inherently included in the topographic position data later acquired by the unmanned craft during automated navigation.

The invention can be practiced either by using reference data which have been acquired during reconnaissance flight over the same territory, and under utilization of the same instrumentation for measuring topography, i.e. elevational contour during the subsequent automated flight. Alternatively, the reference data may originate from regular topographic maps, stereo photo, etc., but failing to include terrain specifics, and to correct these reference data on a running basis by means of corrective data which represent the interaction of similar equipment with comparable terrains (irrespective of altitude).

If the elevation and height measuring device is a radar device, the radar echo and timing differs (for the same elevation) if bounced back from forrests, meadows, fields, lakes, houses, even or uneven terrain with ground contour variations below the resolution of the topographic maps, etc. If the reference data have been acquired by an exploratory reconnaissance flight, these differences are automatically included in the acquired reference data, if later the unmanned craft uses the same or same type of radar equipment. If the reference data are based on topographic maps etc., and do not include these differences based on terrain specifics, correction data are to be used which introduce the differences. The correction data may have been acquired on the basis of overflight, at known altitudes, across these various types of terrain, and the correction is introduced on the basis of independent knowledge as when these various types of terrain occur in the territory across which the automated navigation is to take place.

The inventive method permits a highly accurate navigation, because correlation between topographic reference and actual position data yields pronounced correlation maxima which, in turn, permits very accurate positioning of the craft, including course correction etc.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

Proceeding now to the detailed description of the drawings, FIG. 1 shows a source 10 of reference data. This source is, for example, constituted by topographic data, e.g. a set of x, y, z data covering a particular area. These data have been acquired previously by means of altimetry using the same or similar equipment as will be used later. Conceivably, the data as stored in source 10 have been normalized. Speaking generally, source 10 may contain such topographic data covering an area or region which can be considered large as compared with the specific region or area that is to be needed.

Figure 1:
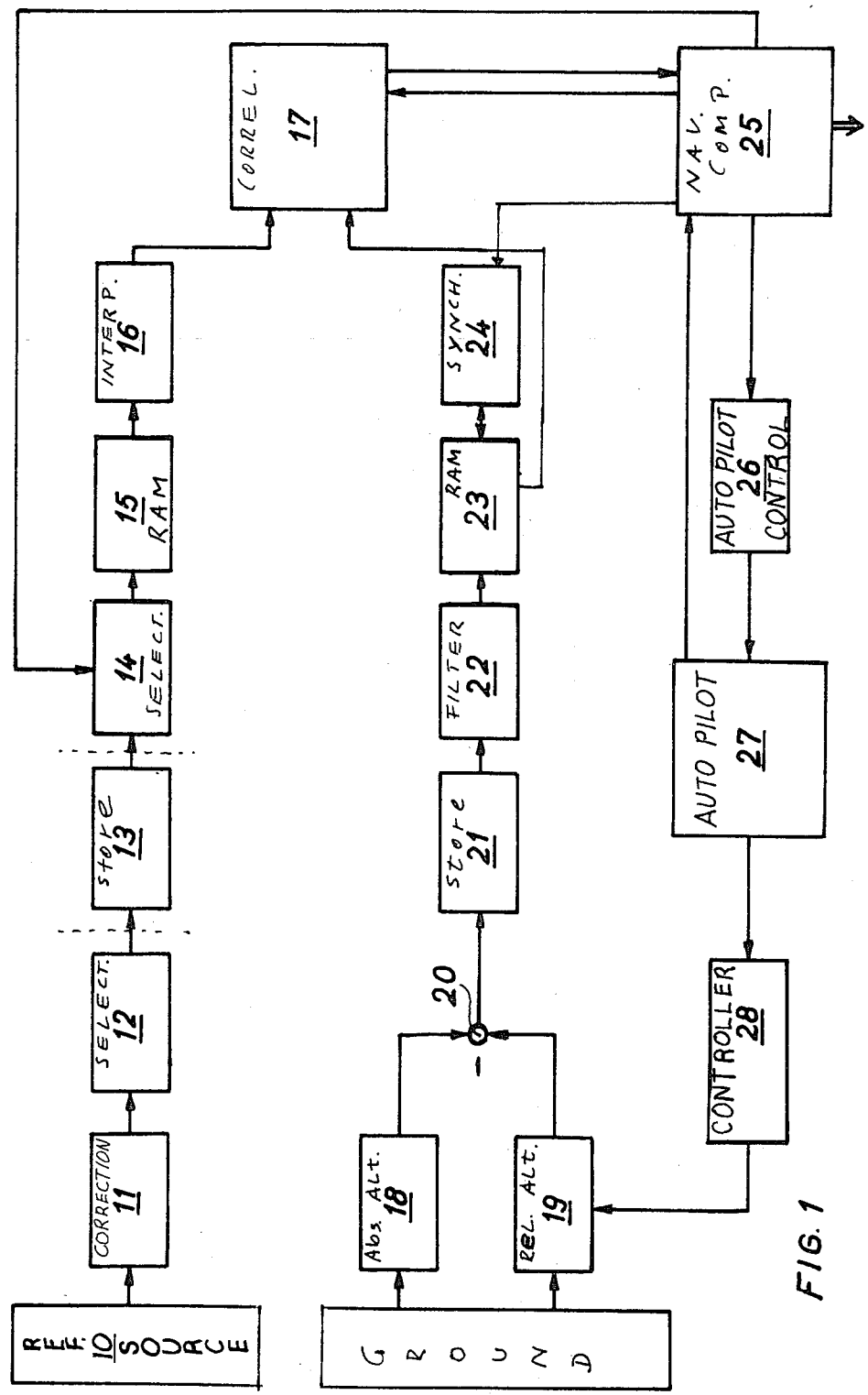
FIG. 1 is a block diagram of a system incorporating the features of the invention.
Figure 2:
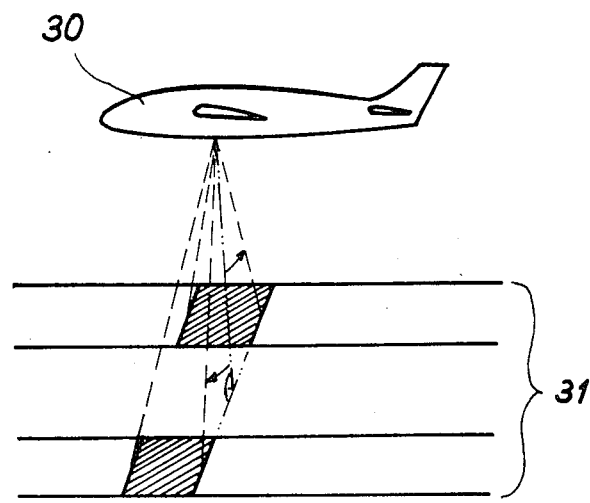
FIG. 2 is a schematic view of an aircraft using two radar altitude meters for measuring relative elevation and topography.
Figure 3:
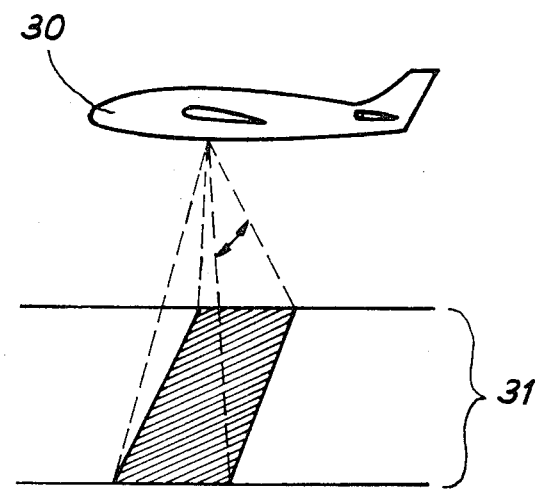
FIG. 3 is a view similar to FIG. 2, but using a laterally pivoting, oscillating radar altimeter.

Turning for the moment to FIGS. 2 and 3, these figures can be interpreted as representation of this initial acquisition process. The craft 30 flies over territory whose topographical data are to be acquired. Reference numeral 31 refers to a flight path which the craft takes. The craft beams down continuously two radar beams with a lateral offset angle in relation to a vertical plane of symmetry. Thus, the craft monitors continuously or in steps the relative elevation of the ground underneath, but slightly to the left and to the right of the craft. Actually, two tracks are being scanned in that manner. The craft will scan the prospective area of future unmanned overflight in such parallel strips.

It is important that the elevation measuring equipment be the same as the one expected to be used later by and in the unmanned craft. Specifically, the radar equipment of the craft has measured its altitude, whereby the measurement includes terrain specific errors. The echo timing (for the same altitude) differs, if the flight path 31 leads across forrests, even different types of forrests, hilly country, wherein the surface undulations border or are below the resolution of true altitude measurement; grassy areas; cities and villages; lakes, etc. Thus, the altitude and topographic data as so acquired, and as stored digitally, analogue or otherwise (e.g. in form of contour maps) in the source 10 include the inherent, systematic errors of the acquisition process.

The craft 30 in FIG. 3 scans the flight path 31 directly through by laterally oscillating the radar beam back and forth to scan the path 31 at a greater resolution. Again, a similar way of scanning and tracking should then be used by the unmanned craft. Also, this method and equipment acquires altitude and relative topographic data which include systematic errors resulting from the interaction of the radar with the specific terrain. Thus, if source 10 is a topographic map, it is not one of the regular type, but one which includes the systematic terrain-errors due to the specific, i.e. radar altitude measurement.

An alternative mode of generating reference data is to synthesize them in the following manner. As stated, the actual area over which an unmanned craft is going to fly may not be available for reconnaissance overflight and topographic reading and surveillance. The synthesis can, therefore, involve the following. Topographic maps may be available, so that x, y, z values along desired flight path and adjacent zones can be taken from these maps and prepared and stored as digital data. In addition, corrective values can be acquired by means of radar scanning as per FIG. 2 or 3, but using representative terrains at a given altitude. The altitude values gained in that process can be digitized as corrective data, to be used later in augmentation of the topographic reference data which do not include terrain specific errors.

A selector unit 12 which may include or be part of a processing facility selects the desired data from the source. In particular, the selection unit may operate under a program which furnishes x and y coordinates of the prescribed and contemplated course an unmanned and automatically controlled and navigated aircraft is going to take. The selection to be made may be understood to be a scanning process which selects topographic values (z) on the basis of raster points, i.e. on the basis of x and y coordinates which are spaced by a specific distance. The selection choses these coordinates not so much on the basis of tracking a linear path, but on the basis of a strip having a width which covers a wider area. In other words, this selection may include topographic (z) data along raster points to the left and to the right of the particularly chosen (and ultimately desired) path, depending upon the possible course deviations the unmanned craft must be expected to experience. Accordingly, multiple parallel track paths may be selected accordingly, spaced, preferably, by the raster distance though that it is not essential.

As stated, the selector 12 causes the extraction of the respected z values, representing local topography from the source on the basis of x, y raster points, and a stage 11 provides for the necessary correction from the normalized state in which the data are stored. For example, the topographic data may be stored in blocks covering a relative large area having a particular average or minimum elevation above sea level so that only elevation in relation to that level are stored for each x, y raster point. Stage 11, therefore, will cause the block elevation to be appended (added, concatenated) to the stored topographic z levels.

The selected topographic data along a contemplated course strip are stored in a store 13 in a manner permitting extraction under navigational control pursuant to the course the craft is supposed to follow. For example, the store 13 may store the elevational or topographic data, in the sequence of that course tracking it along a center line of a wider strip so that elevational data are included in raster points to the left and to the right of that course. Conceivably, store 13 could be implemented as several parallel operating push down stacks, or 13 could include a bulk storage device (tape, disc, etc.) with buffered output to keep the buffer at a particular state of filling once data are called upon.

It should be noted that in the case of using a radar scan as per FIG. 2 for the acquisition of reference data as well as for the position tracking of the automatically navigated aircraft, the course is, in fact, defined by two parallel raster point paths for which the topographic values are present, and the flight path proper runs between these two paths.

As indicated by the dotted lines, the operational steps as described thus far, are of a preparatory nature. Therefore, the store 13 once filled with the complete set of topographic flight data as described, can be disconnected from 12 to be connected to the on-board system of the craft to be navigated across the particular territory.

Proceeding now to the description of the on-board equipment, reference numeral 25 refers to a navigational computer. In accordance with an internal program, and on the basis of a real time clock, computer 25 calls on the store 13 to select the topographic data defining the desired course at the rate of need. As stated, store 13, and in preparation for the flight, holds a sequence of topographic data (z values) on the basis of particular, x, y coordinates and raster points, as well as topographic data to the left and to the right of the specific course as approximated by x, y values.

In the essence, computer 25 associates (or has associated) the z values to be called, for specific raster points, with memory addresses in store 13 corresponding to the timing as to when the craft is to fly across any particular raster point. The association includes the z values of raster points to the left and to the right of that course. Therefore, specific z values stored now in 13 define the topography of the desired flight path, and the memory addresses stand in representation of desired overflight. Additionally, depending upon the presentation of reference data, 16 may, in fact, interpolate and/or average the topographic data of a two track reference or two path reference if double scan as per FIG. 2 was used. In the case of FIG. 3, the back and forth scan may have already resulted in a corrected, average linear, on course topography.

Since the RAM 15 may have a limited capacity, selector 14 may cause a block (i.e. a particular plurality of locations) to be filled in that manner, and then alternates to another block which was filled earlier, but whose content has now become outdated, and can be dumped.

The basic method employed in flight path tracking is based on the principle of trial and error. That is to say, the system seeks to establish whether the craft is directly on course, at the right speed, or a little slow and off course. Therefore, the sequence of data on the topography across which the craft is supposed to fly may, in fact, never correspond to data acquired during actual flight. In other words, the craft may never pass across the desired topography as defined by the primary values stored in 13, but the craft may cruise on one of the parallel paths. For this reason, the z data of the prescribed path may have to be replaced by z data to the left or the right of that path in order to determine the actual flight path. Reference numeral 16 refers, in fact, to a hardware or software package which modifies the z data as per the desired flight path by using the z data for raster points to the left and/or to the right of the desired path to establish interpolated z values. This way, alternative paths and topographies are created to be compared with actual overflight data. The comparison is made by the correlation 17 whose operation includes also the control and modification of these reference data in order to find the actual flight path the craft has been taken.

Continuing with the description of the on-board equipment, the craft has an absolute altimeter 18 responding, for example, to ambient air pressure from which a value representative of the altitude above sea level is desired. A relative altimeter 19 being, e.g. a radar device, responds to the altitude of the plane above ground. This radar equipment can be of the type outlined above with reference to FIGS. 2 and 3. It should be noted that in the case of FIG. 2, the measurement is in fact, carried out in two tracks and results in two data trains accordingly. In either case, including a simple single straight down (or averaged, back and forth) scanning, radar altimetry produces a stream of relative topographic data. The true topographical elevation of the ground across which the craft flies is given by the difference between these two outputs, and a stage 20 is connected to form the difference between the output signals from the devices 18 and 19, accordingly.

The output signals from the difference forming stage 20 are fed to a temporary store 21, being, for example, a push-down stack with a sample-and-hold and digitizing input. The digitization as well as the resolution of the running topographic information thusly acquired, may well exceed the resolution necessary for the ultimate purpose. In any instant, store 21 holds such topographic information as acquired on a running basis, and covering the topography of a narrow strip along the course which the craft just has taken.

As schematically indicated, the data as stored in 21 are subjected to noise correction in a stage 22 constituting, for example, a digital filter to eliminate real or apparent topographic variations which exceed the variations (in time) of the raster sequence frequency of the reference data. The noise elimination involves primarily random noise and not any systematic, terrain dependent errors.

The corrected data are fed to a memory 23 which is, for example, a random access memory holding available for use presently acquired topographic data. The data may be accumulated in that memory in that sequentially acquired topographic values are stored in successive addresses to fill a block of storage locations, i.e. up to a particular amount of thusly accumulated topographic information along the flight path. After the block has been filled, the data are accumulated in another block. The information held in a previously used block but now outdated, may be dumped, so that the block can be used for a new set of data. The data as acquired may still be stored at a higher resolution than necessary. Moreover, they may be set into the stores 21, 23 at a fixed, rather high sample rate.

A device 24 (or software package) calls on the RAM 23 data in dependence upon the actual speed of the craft. The data as stored in RAM 23 represents a fixed sample rate. Thus, the spacing of the ground points represented by the z data is dependent (inversely) upon speed. In order to permit these data to be properly referenced against the fixed spacing (raster points) of reference data in RAM, the navigational computer 25 must make a speed dependent selection of data samples so that the series of data samples extracted from RAM 23 is taken from overflight points being spaced by the raster distance of the reference data. Reference numeral 24 represents that synchronization. A high resolution and redundancy of data in 23 permits the constant rate sampled data to be selected as to constant raster point spacing!

The correlation stage 17, already mentioned above, may actually be part of the on-board computer facility or it could be an autonomous unit. Its function is to take the information or part of it held in RAM 23, and to correlate it with the topographic flight path data in RAM 15. As stated, the data as extracted from the RAM 23 are synchronized to represent topographic values of fixedly spaced raster points. A number of sequentially acquired topographic track data (z values) are taken from the RAM 23, and correlated with data from RAM 15. Specifically, the correlating device will take a number of z values from RAM 15, held in sequential addresses which represent definite points *and* instants of required overflight, and will correlate them with a corresponding number of z values from 23, held in locations identifying points *and* instants of actual overflight. If these instants do not coincide, a phase shift must be introduced in another attempt to seek correlation, and multiple attempts yield a correlation maximum. The relative phase position (in terms of address "displacement") determines whether the craft is fast or slow.

The correlating device 17 determines, in fact, where the craft actually is during its flight, in relation to the location where it is supposed to be, which is determined by the specific updating of the content of RAM 15 with reference data under control of the navigational computer.

If the reference data stream used fails to result in a significantly pronounced correlation maximum, laterally offset reference data, including interpolation, is used to generate one or several topographic reference contours which are correlated with the position data of RAM 23. It should be noted that the rate of updating during flight is at the most a few samples a second based on raster resolution; the actual sample rate may be higher. Thus, multiple correlation attempts can readily be made. The degree of interpolation is indicative of the course deviation.

The result as so obtained by the correlation signals to the navigational computer 25 the conditions under which full correlation was obtained, and the computer calculates therefrom speed and course deviations. Computer 25 interacts with a basic navigational device (SDINS, on the pilot) which provides for actual control of the craft. Reference numeral 26 can also be interpreted as a software package of the navigational computer 25, which calculates flight correction data from the course/speed deviation results to instigate corrective maneuvers of the craft to keep it on course. Speed correction may not be required, rather the computer 25 corrects its own time table as to expected overflight of given reference points. 28 is an optional controller for the radar altimeter.

If the topographic refererence data are terrain independent, a correction is needed in that, on one hand, the flight controller 25 provides to the correlator 17 a sequence of terrain indications of the expected overflight path, identifying the type of terrain. That information may readily be available through maps etc., and the computer 25 tags the expected overflight points as to the type of terrain (forrest, lakes, etc.). The correlator 17 modifies the topographic reference data on that basis to introduce the systematic errors. The modification that is necessary has been previously ascertained on the basis of altitude measurement of comparable "typical" terrain of the same type. The terrain type (forrest, lakes, etc.) or terrain specific corrections of radar altitude measurement can be introduced even though they have been acquired on the basis of a radar altitude measurement of a different region but of the same terrain types as mentioned.

The topographic data as acquired during the unmanned flight, particularly in and around specific stationary or quasi-stationary target areas can be used subsequently as reference data for additional flights.

The invention is not limited to the embodiments described above but all changes and modifications thereof not constituting departures from the spirit and scope of the invention are intended to be included.

We claim:

1. A method of automatically navigating an aircraft across a particular territory on the basis of topographical reference data to be compared with actual topographical data acquired by the aircraft during overflight across the particular territory, comprising the steps of:

acquiring prior to said overflight topographic reference data under conditions which include systematic errors introduced by a specific altitute measuring device, the reference data used are regular topographic data, and the systematic errors are introduced by providing terrain-specific corrective data by means of said specific altitude-measuring device;

acquiring the actual topographic position data under utilization of the same type of specific altitude-measuring device which introduces similar errors; and using these reference data together with the topographic position data to obtain said comparison, including correcting the reference data by introducing systematic errors on the basis of the corrective data.

* * * * *